United States Patent [19]

Helfenstine et al.

[11] 4,197,667
[45] Apr. 15, 1980

[54] BUBBLING FISHING LURE

[75] Inventors: Ronald A. Helfenstine, Fort Worth; Richard W. McDaniel, Hurst, both of Tex.

[73] Assignee: Sports Marketing, Inc., Fort Worth, Tex.

[21] Appl. No.: 896,755

[22] Filed: Apr. 17, 1978

[51] Int. Cl.$^2$ .............................................. A01K 85/00
[52] U.S. Cl. ................................. 43/42.06; 43/42.24; 43/42.35; 43/4.5
[58] Field of Search ............... 43/4.5, 42.06, 42.24, 43/42.26, 42.27, 42.28, 42.29, 42.3, 42.34, 42.35

[56] References Cited

U.S. PATENT DOCUMENTS

| | | | |
|---|---|---|---|
| 2,878,611 | 3/1959 | Netherton et al. | 43/42.06 |
| 2,908,988 | 10/1959 | Kramer | 43/42.06 |
| 3,108,389 | 10/1963 | McGuire | 43/42.06 |
| 3,760,528 | 9/1973 | Moore | 43/42.24 |
| 4,074,455 | 2/1978 | Williams | 43/42.06 |

FOREIGN PATENT DOCUMENTS 99223 11/1961 Norway .................................. 43/42.24

*Primary Examiner*—Gary L. Smith
*Assistant Examiner*—Robert P. Olszewski
*Attorney, Agent, or Firm*—Hill, Van Santen, Steadman, Chiara & Simpson

[57] ABSTRACT

A fishing lure body has at least one cone shaped air trap pocket with a small apical port opening to the outside whereby on entry of the lure into fishing water the air in the pocket provides some buoyancy and the air is adapted to bubble from the pocket as a fish attractor. Water in the pocket provides a reflecting surface visible through the opening and serves as a further attractor. Soft flexibly resilient structure of the body permits the water to squirt from the pocket through the opening when a fish strikes the lure. The body may be of various forms such as simulating a worm, a lizard, salamander, grub, and the like.

5 Claims, 5 Drawing Figures

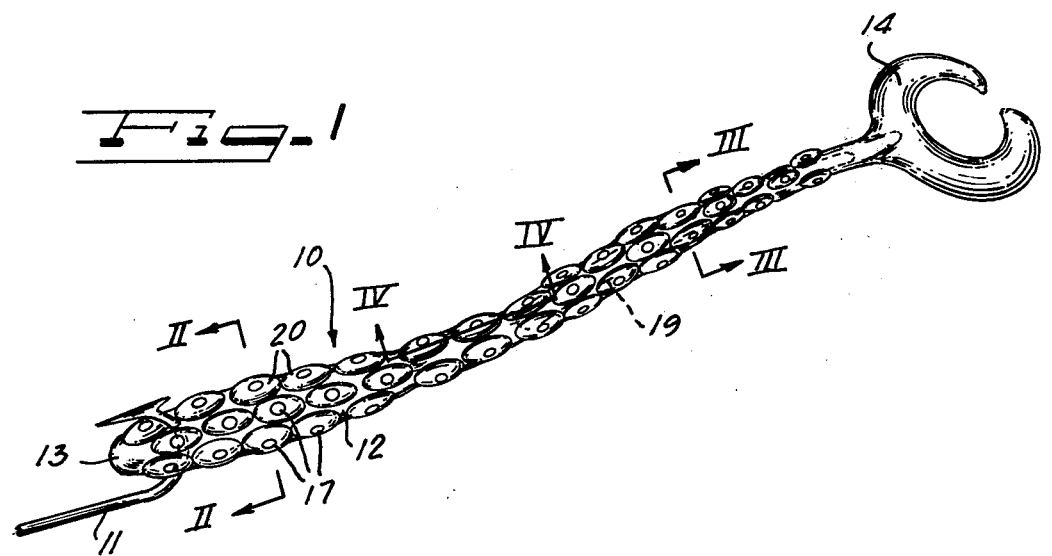
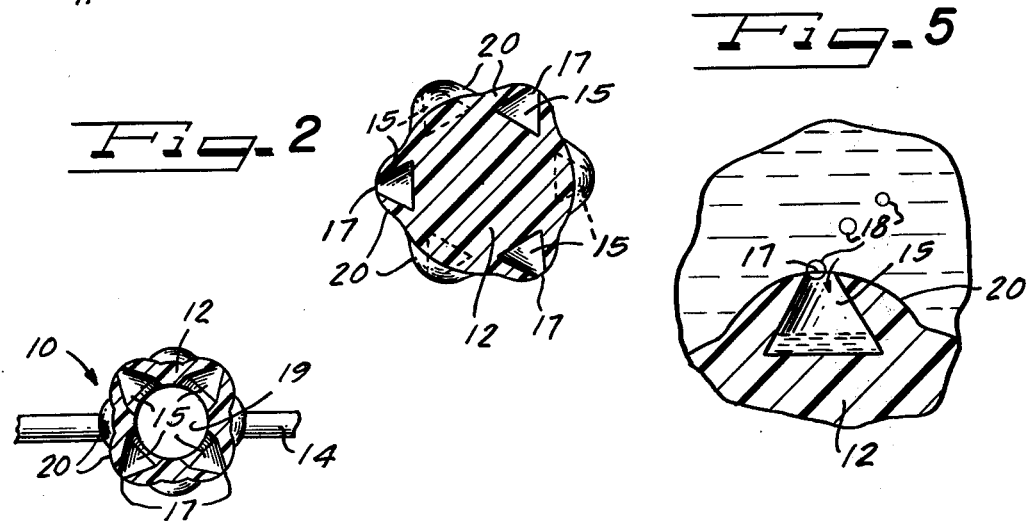
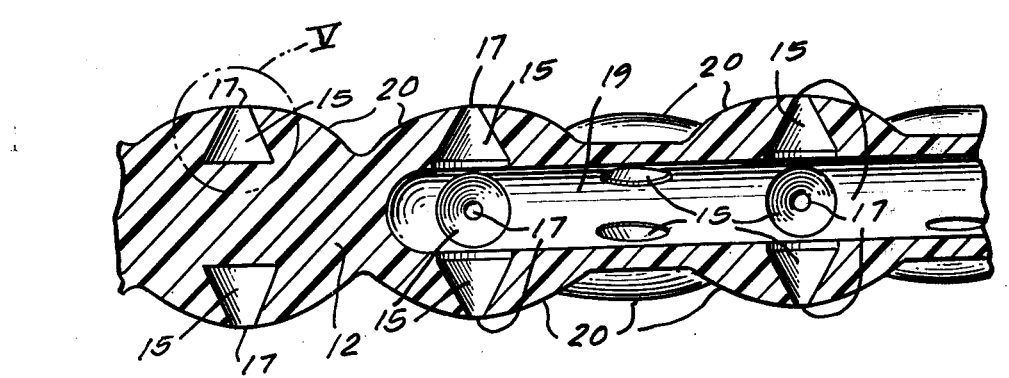

BUBBLING FISHING LURE

This invention relates to a novel fishing lure, and is more particularly concerned with a lure especially adapted for generating fish attractor bubbles during a fishing maneuver.

In addition to constructing fishing lures in shapes which generally simulate edible objects, it is desirable that the lure provide or be accompanied by some sort of action in the water as a fish attractor. Of course, fish interest in the lure is enhanced if the action fairly closely simulates an action recognized by the fish as associated with the object the lure is intended to resemble.

Some water inhabiting creatures which serve as natural food for fish inhabiting the water in addition to having recognizable appearance may at least from time to time exude or exhale air bubbles which will guide a hungry fish to the bubble-emitting creature. Most creatures which may serve as fish prey on entering water will carry into the water with them air which will leave the body of the creature as a trail of bubbles so that a lurking fish can readily locate and strike any such creature if the fish is interested.

An important object of the present invention is to provide a new and improved fish lure involving bubbling air as a fish attractor.

A fishing lure embodying principles of the invention has a body provided with an outer surface, the body having at least one air trap pocket of substantially shallower depth than the diameter of the body and normally at least partially empty, the air trap pocket being of cone shape with the base of the cone at the inner end of the pocket, a port at the apex of the cone shaped pocket, such port being of substantially smaller diameter than the base of the pocket, the port being located at the outer surface of the body, and the cone shape of the pocket being defined by a conical wall in the pocket tapering convergently from the base of the pocket to the apical port, whereby on entry of the lure into water, air in the pocket provides some buoyancy for the lure and the small diameter of the port not only restricts entry of water into the pocket through the port but also interferes with escape of displaced air from within the pocket, so that emission of air from the port is in the form of small, fish-attracting air bubbles issuing at a relatively slow rate from the port as the rate of entry of displaced water into the pocket through the port is restrained by the displaced air emission through the port, resulting in both buoyancy and air bubble emission being prolonged.

Other objects, features and advantages of the invention will be readily apparent from the following description of certain representative embodiments thereof, taken in conjunction with the accompanying drawing although variations and modifications may be effected without departing from the spirit and scope of the novel concepts embodied in the disclosure and in which:

FIG. 1 is a perspective view of a representative form of lure embodying principles of the present invention.

FIG. 2 is an enlarged fragmentary transverse sectional detail view taken substantially along the line II—II of FIG. 1.

FIG. 3 is an enlarged transverse sectional detail view taken substantially along the line III—III of FIG. 1.

FIG. 4 is an enlarged fragmentary longitudinal sectional detail view taken substantially along the line IV—IV of FIG. 1; and FIG. 5 is a detail view of substantially the encircled area V of FIG. 4 and demonstrating bubbling action when the lure is in the water.

By way of illustration, there is shown in FIG. 1 a fishing lure 10 which may be considered as generally simulative of a worm-like creature and adapted to be impaled upon or harnessed to a fish hook 11 so as to be employed in a fishing maneuver. Desirably the lure 10 is adapted to be made from a relatively soft resiliently flexible material comprising any preferred rubber-like material suitable for this purpose and adapted to be molded to provide the desired form and configurations of the lure. In the illustrated example, the lure 10 comprises an elongate body 12 tapering from a head end 13 to a tail 14 of any preferred configuration and which may be designed to effect a fish attracting motion when the lure is actuated in the water in a fishing maneuver.

To equip the lure 10 with at least some buoyancy and a bubble generating capability, the body 12 is provided with at least one and preferably with an array of air pockets 15 (FIGS. 2, 4 and 5) each of which has a port 17 opening from it to the outside. In a preferred form the ports 17 are of substantially smaller diameter than the associated pockets 15. In a desirable and easily molded form, the pockets 15 may be of cone shape having their apexes at the ports 17 which are of substantially smaller diameter than the inner base ends of the pockets, whereby on entry of the lure into water, air in the pockets provides some buoyancy for the lure and the small diameter of the ports not only restricts entry of water into the pockets through the ports, but also interferes with escape of displaced air from within the pockets, so that emission of air from the ports is in the form of small, fish-attracting air bubbles issuing at a relatively slow rate from the ports as the rate of entry of displacement water into the pockets through the ports is restrained by the displaced air emission through the ports, resulting in both buoyancy and air bubble emission being prolonged. Thereby the pockets 15 have substantial air volume capacity. Normally the air pockets are at least partially empty. Before use, of course, the air pockets 15 may be entirely empty. Upon entry of the lure 10 into water, fish-attracting air bubbles 18 are adapted to issue from the port 17 as water enters the pocket 15 and displaces the air.

In a preferred arrangement the lure body 12 is provided with a substantially all over pattern array of the air pockets 15 and ports 17, with the air pockets 15 located as reasonably close to one another as practicable under the circumstances of shape and size of the lure 10 and having regard to molding practicability. In a generally round worm-like form, the pockets 15 are located about the entire periphery of the lure for effective air bubble action regardless of what portion of the periphery of the lure is uppermost. Such an arrangement of the air pockets 15 also assures that if there is incidental or designed turning of the lure 10 in the water there will be a continuous succession of the pockets 15 oriented for emission of air bubbles through the ports 17 of the pockets which successively turn uppermost. Since the ports 17 are substantially smaller than the diameter of the associated pockets 15, the ports will act substantially as metering orifices to control air bubble emission as the air struggles to escape against air displacing water leaking into the pockets through the ports.

Enhanced buoyancy and air bubble action in any selected part of the lure 10 can be attained by providing an enlarged air chamber 19 (FIGS. 1, 3 and 4) within the lure body 12 and communicating with at least certain of the air pockets 15. In the illustrated example, the lure 10 has the chamber 19 axially within a rear or tail end portion of the body while the remainder of the body is solid except for the air pockets 15 located about the periphery of the body. Each of the air pockets 5 in that section of the body 12 which has the air chamber 19 may communicate at their inner ends with the air chamber. Through this arrangement, during a prolonged fishing maneuver such as in trolling during which substantially all of the air may be expended from the air pockets 15 in the head end solid portion forwardly from the chamber 19, the relatively large reserve volume of air in the chamber 19 will continue for an appreciable length of time to supply the associated pockets 15 with bubble air, whereby to substantially sustain and prolong the buoyancy and air bubble action as the lure is drawn through the water or even when the lure is allowed to sink into a pool or to the bottom.

For enhanced creature simulation, action in the water and flexibility of the lure along its length, the longitudinal core of the lure body 12 may be of minimum practical diameter, and the air pockets 15 defined to at least a substantial extent within bumps or nodes 20 on the surface of the body core. This arrangement also facilitates a desirable reaction when a fish strikes and takes the lure 10 when the nodes 20 will yield under compression and water in the pockets 15 will squirt out of the ports 17.

Another fish attracting feature of the lure 10 resides in that pools of water collected in the pockets 15 will provide miniature mirror surfaces which will reflect light entering through the ports 17 to the interiors of the pockets 15, especially on a sunny day or at least when there is light reflected from environmental surface area toward the lure. This affords a glinting action as the lure 10 moves through the water thus providing a fish attractor whether or not the bubble effect is operating.

It will be appreciated, of course, that although a generally worm configuration of the lure 10 has been shown, that it may take any number of different forms such, for example, as a lizard. salamander, grub, minnow and the like, depending upon the type of fishing to be engaged in. Lures will generally attain best results if they more nearly simulate objects or creatures in the indigenous food supply of the fish which are any particular angler's objective.

It will be understood that variations and modifications may be effected without departing from the spirit and scope of the novel concepts of this invention.

I claim as my invention:

1. In a fishing lure having a body provided with an outer surface:

said body having throughout a major length portion thereof an all-over pattern of a plurality of air trap pockets each of which is of substantially shallower depth than the diameter of the body and normally at least partially empty;

said air trap pockets being of cone shape with the base of the cone at the inner end of the respective pocket;

a port at the apex of each of said cone shape pockets, said port in each instance being of substantially smaller diameter than the base of the cone;

said ports being located at the outer surface of said body;

said body being formed from a soft resiliently flexible material and having an array of nodes projecting on said surface and said pockets being located in said nodes;

said cone shape of each of said pockets being defined by a conical wall in the pocket tapering convergently from the base of the pocket to the port of the pocket;

a head end length of said body being solid and the base ends of the cone shape pockets being blind ended in said solid length;

a second length of said body rearwardly from said head length having a longitudinal air chamber therein;

and the base ends of the cone shape pockets in said second length of said body communicating with said air chamber;

whereby on entry of the lure into water, air in said pockets and said chamber provides some buoyancy for said lure and said small diameter of said ports not only restricts entry of water into the pockets through said ports but also interferes with escape of displaced air from within said pockets, so that emission of air from said ports is in the form of small, fish-attracting air bubbles issuing at a relatively slow rate from said ports as the rate of entry of displacement water into said pockets through said ports is restrained by the displacement air emission through said ports, resulting in both buoyancy and air bubble emission being prolonged, and the soft material of said body and said nodes being displaceable when a fish strikes and squeezes the body so that water trapped in said pockets may squirt out through said ports in the squeezed portion of the body.

2. A fishing lure according to claim 1, wherein said second length of said body comprises a tail end portion of said body.

3. A fishing lure according to claim 2, wherein said body is elongate and tapers from said head end length to said tail end portion of said body.

4. A fishing lure according to claim 1, wherein said second portion provides a tail for the body, and said body tapers from said head end length to said tail.

5. A fishing lure according to claim 1, wherein said second length of said body terminates in tail configuration for the lure.

* * * * *